United States Patent
Folkmanis et al.

(10) Patent No.: US 9,432,145 B2
(45) Date of Patent: Aug. 30, 2016

(54) MULTI-CAST OPTIMIZED MEDIUM ACCESS METHOD FOR WIRELESS NETWORK

(71) Applicant: Google Inc., Mountain View, CA (US)

(72) Inventors: Girts Folkmanis, San Francisco, CA (US); Paul Heninwolf, San Carlos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/822,977

(22) Filed: Aug. 11, 2015

(65) Prior Publication Data

US 2015/0349928 A1     Dec. 3, 2015

Related U.S. Application Data

(63) Continuation of application No. 13/847,528, filed on Mar. 20, 2013, now Pat. No. 9,137,642.

(51) Int. Cl.
| | |
|---|---|
| *H04L 1/16* | (2006.01) |
| *H04W 4/06* | (2009.01) |
| *H04B 7/155* | (2006.01) |
| *H04L 12/18* | (2006.01) |
| *H04L 1/18* | (2006.01) |
| *H04L 1/00* | (2006.01) |

(52) U.S. Cl.
CPC ............ *H04L 1/1628* (2013.01); *H04B 7/155* (2013.01); *H04L 1/1829* (2013.01); *H04L 12/1868* (2013.01); *H04W 4/06* (2013.01); *H04L 12/1881* (2013.01); *H04L 2001/0097* (2013.01)

(58) Field of Classification Search
None
See application file for complete search history.

(56) References Cited

U.S. PATENT DOCUMENTS

| | | | |
|---|---|---|---|
| 7,948,991 B1 | 5/2011 | Hart et al. | |
| 8,072,944 B2 | 12/2011 | Proctor, Jr. | |
| 8,284,754 B2* | 10/2012 | Chang | H04L 1/1607 370/350 |
| 8,483,116 B2* | 7/2013 | Chang | H04L 1/0081 370/226 |
| 8,599,738 B2* | 12/2013 | Lin | H04L 1/0001 370/315 |
| 8,649,316 B2* | 2/2014 | Seo | H04L 1/1854 370/315 |
| 2005/0249120 A1* | 11/2005 | Heo | H04L 1/0007 370/236 |

(Continued)

FOREIGN PATENT DOCUMENTS

| | | |
|---|---|---|
| EP | 2244403 A1 | 10/2010 |
| WO | 2009157849 | 12/2009 |

OTHER PUBLICATIONS

International Search Report in Application No. PCT/US2014/023944, mailed Sep. 16, 2014.

(Continued)

*Primary Examiner* — Hong Cho
(74) *Attorney, Agent, or Firm* — Morris & Kamlay LLP

(57) ABSTRACT

Collisions in wireless networks may be avoided by stacking acknowledge messages, relaying the stacked acknowledge messages, and reducing the number of acknowledge frames transmitted as a result of successful stacked acknowledge message transmissions. Additionally, a blind relay setup may be implemented to increase successful transmission rates such that a relay node in a transmission chain is configured to relay a frame without addressing the relay to a specific node. Non-neighboring nodes may receive frames out of order and relay the frames despite the out of order delivery.

20 Claims, 8 Drawing Sheets

(56) References Cited

U.S. PATENT DOCUMENTS

| | | |
|---|---|---|
| 2008/0279145 A1 | 11/2008 | Boariu et al. |
| 2010/0080139 A1* | 4/2010 | Palanki ................ H04B 7/2606 370/252 |
| 2010/0097969 A1 | 4/2010 | De Kimpe et al. |
| 2010/0097978 A1* | 4/2010 | Palanki ................ H04L 1/1867 370/315 |
| 2010/0271999 A1* | 10/2010 | Yu .......................... H04B 7/155 370/312 |
| 2011/0305148 A1 | 12/2011 | Kim et al. |
| 2014/0160930 A1* | 6/2014 | Kwon ................... H04W 16/26 370/235 |

OTHER PUBLICATIONS

PCT Search Report, mailed in PCT/US2014/023944 on Dec. 8, 2014.

* cited by examiner

MULTI-CAST OPTIMIZED MEDIUM ACCESS METHOD FOR WIRELESS NETWORK

BACKGROUND

Traditional multi-hop wireless network protocols often share characteristics with the architecture for physical wired networks. More specifically, traditional wireless networks use acknowledge frames that travel through a sequential set of routing devices or point-to point links. As an example, a traditional wireless network may be configured such that an acknowledge frame containing an acknowledge message is generated as a result of the successful delivery of a packet frame to a destination node D. The setup may require the acknowledge frame to be delivered to a source node S via three nodes C, B, and A. Accordingly, the configuration may transmit the acknowledge frame from the destination node D, to relay node C, to relay node B, to relay node A, and to the source node S, in order. Each node may receive address information regarding where a transmission or relay of the acknowledge frame by that node is intended to be delivered. Additionally, if the transmission from a node in the transmission chain fails to reach an intended node, the entire transmission process may fail.

Additionally, traditional wireless protocols generally support wireless transmission acknowledge messaging in a very limited manner or do not support them altogether due to the collision storm caused by a plurality of the multicast devices attempting to transmit acknowledge messages at nearly the same time. Certain traditional wireless protocols may support single-hop multicast acknowledge messaging where the source can send multicast transmission to and receive acknowledge messages from its immediate neighbor and not to devices more than one hop away.

BRIEF SUMMARY

According to implementations of the disclosed subject matter, a first acknowledge frame that includes a first acknowledge message may be transmitted via a transmission chain, the transmission chain containing one or more relay nodes. A second acknowledge frame may be transmitted from the first acknowledge message, which contains the first acknowledge message and a second acknowledge message. The second acknowledge message may be received from a second node different than the node that transmitted the first acknowledge message, and the second node may be a non-neighboring node.

According to implementations of the disclosed subject matter, a first frame directed to two or more destinations is transmitted via a transmission chain, the transmission chain containing a plurality of relay nodes. The first frame may be received by one or more relay nodes and may not contain a subsequent transmission address and the one or more relay nodes may be a non-neighboring relay node. The first frame may be transmitted by the one or more relay nodes, the transmission not directed to a specific transmission address.

Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Avoiding collisions during a transmission within a wireless network can improve network performance. Collisions may occur in a wireless network when one or more nodes in the network experience co-channel interference such that two or more different transmitters using the same frequency transmit at the same time. A receiver within range of the two or more transmitters may receive the transmissions at the same time, resulting in a collision which can invalidate all transmissions to the node, reduce the quality of one or more of the transmissions, or, more generally, can deteriorate the performance of the network. The transmissions may originate from participating nodes such that the two or more transmitting nodes are participants of a transmission. For example, if a source node intends to transmit a packet frame to a destination node via a relay node, then the source node, relay node, and destination node may be considered "participants" or "participating nodes". Additionally, transmissions may originate from non-participating nodes. A non-participating node may be a node that is not an included in a particular transmission or series of transmissions. For example, if a source node intends to transmit a packet frame to a destination node via a relay node, then a separate node that is not the source, relay, or destination node, may be considered a non-participant node since it is not involved in the transmission. It is beneficial to prevent or reduce collisions in a wireless network from both participant and non-participant nodes.

Figure 3:
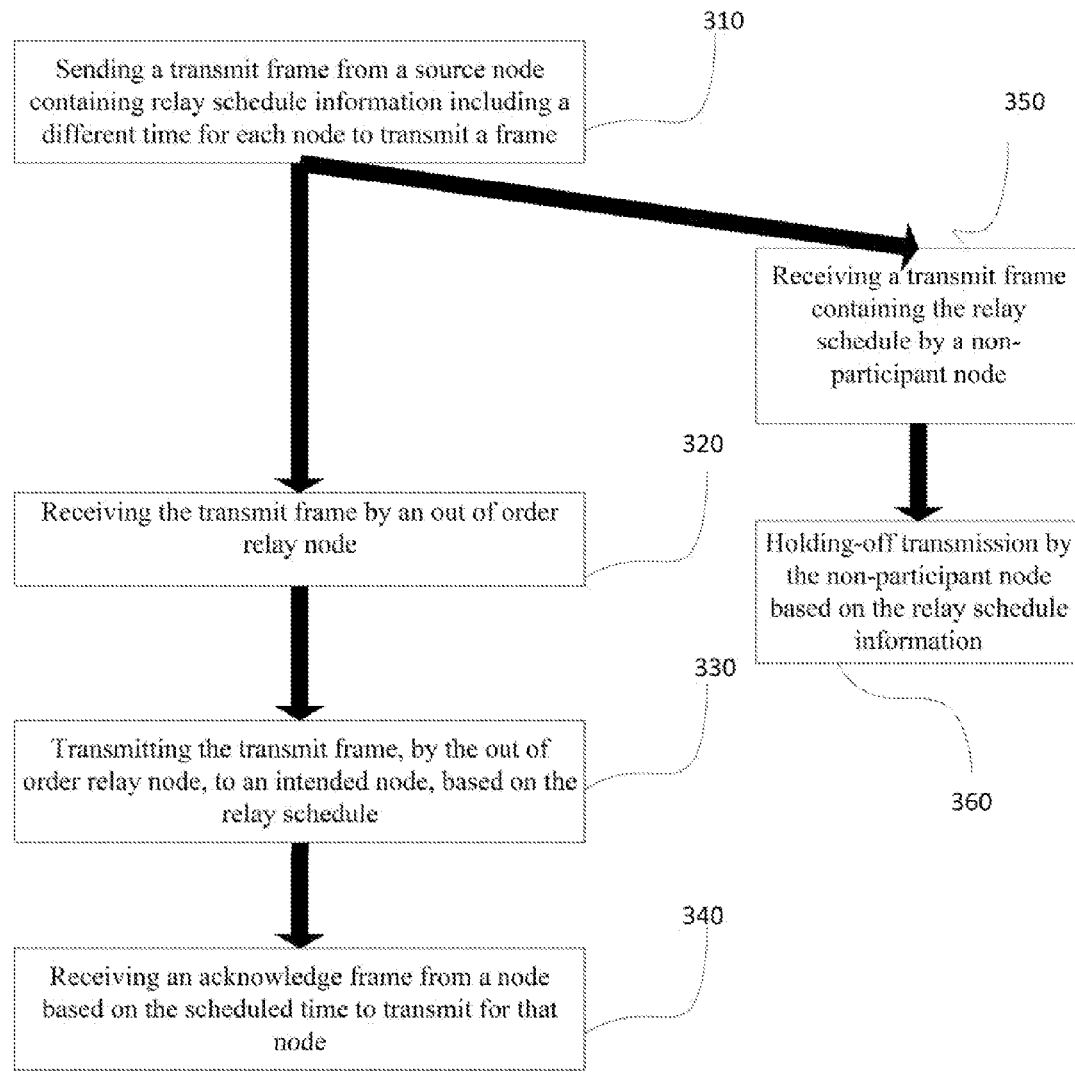
FIG. 3 shows an example process for transmitting a packet frame with scheduled relay information and receiving an acknowledge message according to an implementation of the disclosed subject matter.

FIG. 3 shows an example process for transmitting a packet frame with scheduled relay information and receiving an acknowledge message according to an implementation of the disclosed subject matter. As shown at step 310, a packet frame can be sent from a source node and may contain relay schedule information including a different time for each node to transmit a frame. For example, a Wi-Fi router may transmit instructions to a laptop computer via multiple relay nodes, which include a relay schedule. The schedule, in this example, can contain times for each relay in the network to repeat the transmission and different designated times such that the relay transmissions do not collide with each other. At step 320, a packet frame may be received by an out of order relay node. For example, a Wi-Fi router can send a transmission with a relay schedule, the relay schedule being ordered such that relay node 1, 2 and 3 are to receive and repeat the transmission, in order. Relay node 3 may receive the transmission out of order from relay node 1 and may not receive a transmission from relay node 2, as scheduled. At step 330, an out of order node may transmit a frame based on the relay schedule. For example, a relay node that receives a transmission out of order may repeat the transmission based on the relay schedule whether or not an in order transmission is received by the relay node.

According to implementations of the disclosed subject matter, a relay schedule can contain transmission times for acknowledge frames, or times at which relay nodes may transmit in general. The relay schedule may contain two times for a given node per transmission such that the relay node is assigned a first time for transmitting a packet frame and the same relay node is assigned a second time for transmitting an acknowledge frame. At step 340, an acknowledge frame can be received from a node at a scheduled transmission time for that node to transmit the acknowledge frame, according to the relay schedule. For example, a relay schedule may designate a time A for a relay node 3 to transmit, and, accordingly, relay node 3 may relay an acknowledge frame at time A, that was received from another node prior to time A. According to implementations of the disclosed subject matter, at step 350, a non-participant node may receive a packet frame containing a relay schedule. At step 360, the non-participant node may delay one or more transmissions based on the relay schedule information such that it does not transmit during the times that other participating nodes transmit, as designated by the relay schedule. As previously described, a non-participant node may be a node that is not an intended node with respect to a transmission chain. For example, a Wi-Fi router may transmit instructions along with a relay schedule that includes relay nodes 1, 2, and 3 as well as an implied total scheduled transmission lasting 1 second. A non-participating relay node 4 may also receive the transmission and, based on the relay schedule, may delay transmitting until the scheduled 1 second has passed.

According to implementations of the disclosed subject matter, the packet frame transmitted by a source node may contain, but is not limited to, a relay schedule, the length of a packet for transmission, the number of relay nodes intended to repeat the transmission, identifying information related to the relaying nodes, and frame transmission fields such as the source, destination, payload, and the like. The frame may be intended to be transmitted by each relay node within the transmission chain. Acknowledgements may originally be transmitted by the destination node or from individual relay nodes, or both. For example, each node that receives a transmission, including relay frames, may be required to acknowledge receiving the transmission to at least one other node in the transmission chain. Alternatively, only the destination node may generate an acknowledge frame, which is then relayed back to a source node that initiated the transmission.

According to implementations of the disclosed subject matter, as shown in FIG. 3 at step 310, a source node may transmit a frame containing relay schedule information. The frame may be or may include any applicable data transfer mechanism such as, but not limited to, one or more packets, one or more digital data transmissions, a sequence of bits, a sequence of symbols, or the like. The relay schedule information may be stored separate from a payload portion of a frame, and may be included in all transmissions of the frame or a sequence of related frames. For example, a digital data packet frame containing relay schedule information may initially be transmitted from a router. The intended destination of the transmission may be a video game console located remotely from the router. There may be three intermediate relays, Relay A, Relay B, and Relay C between the router and the video game console which can relay the transmission towards the console. According to this example, the router may initiate a transmission containing the frame which includes the relay schedule and a payload containing game instructions for the video game console. The relay schedule may be encoded using binary code. The payload containing instructions for the video game console may be separate from the relay schedule. Additionally, the times within the relay schedule may be organized with restricted hold-offs such that there are no hold-offs or minimal hold-offs between transmission times. Hold-offs can be buffer times such that a node waits, or holds off transmission. According to implementations of the present subject matter, there may be no hold-offs or very minimal hold-offs sufficient to counter variations in clocks or radio behavior, which may lead to faster transmission times. For example, in a transmission chain the relay schedule may assign nodes A, B, C, and D times 1x, 2x, 3x, and 4x respectively such that x corresponds to the time it takes for a transmission between one node to the next to occur, which may include any processing time expected for a transmission. Accordingly, there may be no hold-offs between transmissions and each node may transmit based only on the time delay caused by the transmissions themselves.

A relay schedule may contain different times for transmission by different nodes such that the participating source, relay, and destination nodes may each have assigned transmission times. A time may be a specific time or a range of times within which a certain action may take place. For example, the relay schedule may contain a time A for when a node X can transmit a frame. Alternatively, for example, the relay schedule may contain a range of time, such as between time B and time C, for when a node Y can transmit a frame. According to implementations of the disclosed subject matter, the transmission times may be distinct such that there are no simultaneous transmissions. For example, a source node, relay 1 node, and relay 2 node may be assigned times 1, 2, and 3 respectively. The times may be distinct from each other such that none of the source, or relay nodes transmit at the same time. Where the assigned times are time ranges, they may be distinct such that they do not overlap. Although typically the times do not overlap, the times may overlap, especially when a substantial distance exists between nodes relaying transmissions. A flag may be added to determine transmission interference potential and may allow overlapping times when the interference potential is below a threshold value. Additionally, a destination, relay 2 and relay 1 node may have times 4, 5, and 6 assigned to them respectively. The times may be distinct from each other such that none of the destination and relay nods transmit acknowledge frames at the same time, or within overlapping time periods. Transmitting based on distinct scheduled times may improve collision avoidance as the probability of receiving multiple frames by a node at a specific time may be reduced. Namely, the participating nodes that receive the frame or sequence of frames containing the relay schedule may not transmit other than at the designated time for the respective nodes to transmit.

According to implementations of the disclosed subject matter, as shown at step 320 in FIG. 3, a packet frame may be received by an out of order relay node. An out of order relay node may be a participating node that is part of the transmission chain. A transmission chain may include all nodes intend to either receive or transmit a transmission or acknowledge frame or set of related frames. Additionally, an out of order node may be a node not sequentially subsequent to the transmitting node. For example, a router may transmit an instruction message intended for a laptop, the instruction message to be relayed through relay A and relay B. The router, relays A and B, and the laptop may all be participating nodes part of the instruction message transmission chain. The nodes may be set up such that the router, relay A, relay B, and laptop are sequentially arranged in that order. If relay B receives a transmission directly from the router, instead of receiving it from relay A, then relay B can be an out of order relay node.

The order of nodes in a transmission chain may be determined based on the topology of the source, destination, or relay nodes. Namely, a sequentially subsequent node may be a node that is proximally closest to the transmitting node in the appropriate direction. For example, a source, relay A, relay B, and destination node may be arranged in a line such that the source is located at location 1, relay A at location 2, ten feet from the source in the x direction, relay B at location 3, ten feet from relay A in the x direction, and the destination node at location 4, ten feet from relay B in the x direction. Accordingly, the order of the nodes can be either source, relay A, relay B, destination or, in reverse as, destination, relay B, relay A, source. In essence, according to this example, the order is based on the physical location of the nodes. Alternatively, the order may be determined based on the relay schedule such that a sequentially subsequent node may be a node that temporally succeeds a current transmission time. For example, a relay schedule may contain transmission times for a source, relay A, relay B, and destination node such that the source is scheduled to transmit at time 1, relay A at time 2, 10 milliseconds after the source, relay B at time 3, 10 milliseconds after relay A, and the destination node at time 4, 10 millisecond after relay B. Accordingly, the order of the nodes can be the source, relay A, relay B and the destination node. In essence, according to this example, the order is based on the time each node is scheduled to transmit. As an example of ordering nodes based on network topology, a source, relay A, relay B, and destination node may be arranged such that the expected transmit time from the source to relay A is 4 ms, the shortest length of time between the source and any other node. The expected transmit time from relay A to relay B is 5 ms, the shortest length of time between relay A and any other node other than the source node. The expected time from relay B to the destination node is 4 ms, the shortest length of time between relay B and any other node. Accordingly, the order of the nodes can be either source, relay A, relay B, destination or, in reverse as, destination, relay B, relay A, source. In essence, according to this example, the order is based on the network topology associated with the given nodes. Network topology and arrangement may be based on considerations other than physical arrangement and expected transit time, as will be readily understood by one of skill in the art.

According to implementations of the disclosed subject matter, a relay schedule may be based on network topology as provided by a network controller. The network controller may communicate with a source node and the source node may develop a relay schedule based on the communication. For example, a network controller may determine the topology the network, and the network location of each node in the network, by transmitting instructions for all nodes to ping the controller. The controller can provide a source node with the topology information and the source node can determine which relay nodes are necessary for a transmission, and determine a relay schedule accordingly. Alternatively, the controller may determine the topology of each node in the network along with a relay schedule for a source node. The controller may provide the source node with the relay schedule and the source node may initiate a transmission accordingly. A controller may update network topology based on periodic pings such that the controller pings all the nodes during predetermined periodic intervals. Alternatively, the controller may update network topology by receiving automated pings when a node is added or removed from the network. Alternatively or in addition, one or more relay nodes may ping each other and/or a neighboring node and subsequently provide the controller with resulting transmission information. For example, each node in a transmission chain my ping one or more neighboring nodes and record signal strength or packet success rate data. Each node may transmit the information to a controller which can analyze the information and determine a relay schedule based on the analysis.

According to implementations of the disclosed subject matter, as shown at step 330 in FIG. 3, an out of order node may transmit a frame based on the relay schedule. Although typically an out of order node transmits a frame based on the relay schedule, the out of order node may, in certain circumstances, transmit a frame at a non-relay schedule designated time. An out of order node may receive a frame from a node that is not intended to sequentially precede the out of order node. The frame may contain a relay schedule and the out of order node may transmit based on the relay schedule such that the out of order node may transmit at a time provided by the relay schedule, the time corresponding to the out of order node. For example, a transmission chain may contain nodes A, B, C, and D in order. Node A may transmit a frame and node C may receive the frame out of order. The frame can contain a relay schedule with information that allows a node to determine a designated time, for example, 13 milliseconds, corresponding to node C. Accordingly, node C may transmit the frame at the 13 millisecond mark despite not receiving the frame directly from node B.

According to implementations of the disclosed subject matter, the transmission may be for a packet frame or an acknowledge frame. At step 340, an acknowledge frame can be received from a node at a scheduled transmission time for that node to transmit, according to the relay schedule. An acknowledge frame may contain the original relay schedule transmitted by a source during the initial transmission resulting in the acknowledge frame. Continuing the previous example, node D may transmit an acknowledge frame intended for node A via node C and B in order (i.e., from node D to C to B to A). Node B may receive the acknowledge directly from node D instead of node C. The relay schedule may contain a time, 20 milliseconds, corresponding to the transmission of an acknowledge frame by node B. Accordingly, at the 20 millisecond time mark, node B may transmit the acknowledge frame to node A based on the relay schedule despite not receiving the acknowledge frame directly from node C. Notably, a node may receive a transmission and advance the activities within a transmission chain based on a predetermined schedule regardless of whether or not the transmissions are received in order or out of order.

According to implementations of the disclosed subject matter, as shown in FIG. 3 at step 350, a non-participant node may receive a packet frame containing a relay schedule. As disclosed herein, a non-participant node may be a node that is not part of the transmission chain for a given transmission. The non-participant node may receive a packet frame due to the close proximity of the non-participant node. At step 360, the non-participant node may delay one or more transmissions based on the relay schedule information such that it may not transmit during the times that other participating nodes transmit, as designated by the relay schedule. The non-participant node may implement a listen before transmission scheme, and may delay transmissions that conflict with other transmissions. The relay schedule for a transmission chain may enable a non-participant node to determine when a transmission by the relay node may be a conflicting transmission. For example, a relay schedule may contain transmission times which begin at a given time X and end at a time Y. A non-participant node may receive the transmission with the relay schedule and not transmit between time X and Y. Alternatively, the relay schedule may contain transmission times between two ranges; U and V and X and Y. The non-participant node may receive the transmission with the relay schedule and not transmit during the two ranges of time, but may transmit at a time W, which falls between the two ranges.

Figure 4A:
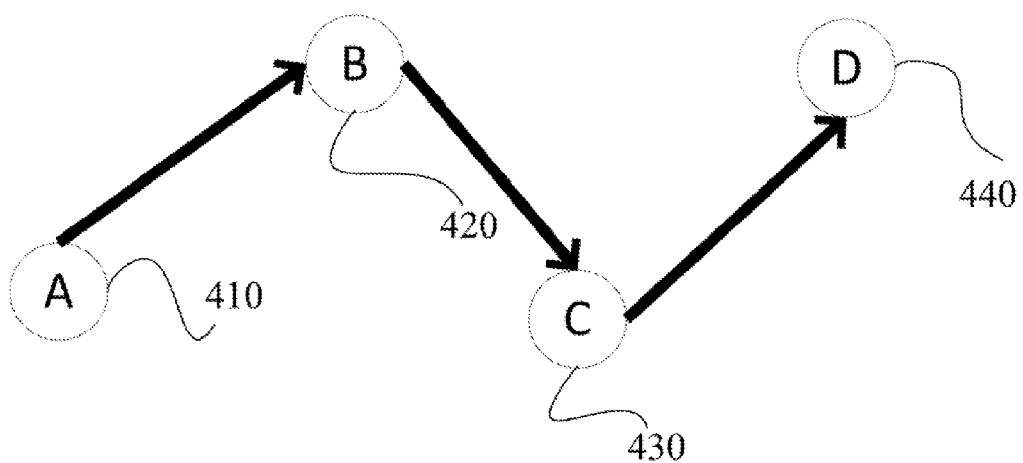
FIG. 4a shows an example visualization corresponding to a node structure and intended transmission route according to an implementation of the disclosed subject matter.

In an illustrative example of the disclosed subject matter, FIG. 4a illustrates an intended path of transmission from a source A 410 to a destination D 440. The transmission chain includes the source A 410, relay node B 420, relay node C 430, and destination D 440. The order of the nodes, according to this example, is A, B, C, and D based on location as shown in FIG. 4a. Although the order in FIG. 4a is shown using physical proximity for illustration purposes, it will be understood that network distance, priority, or other relative measure may be used without departing from the scope and content of the example or the subject matter disclosed herein. Alternatively, the order of the nodes, according to this example, is A, B, C, D, based respective times in a relay schedule as shown in Table 1.

TABLE 1

| Node | Transmission Time (ms) | Acknowledge Time (ms) |
|------|------------------------|-----------------------|
| A    | 0                      | —                     |
| B    | 5                      | 25                    |
| C    | 10                     | 20                    |
| D    | —                      | 15                    |

Figure 4B:
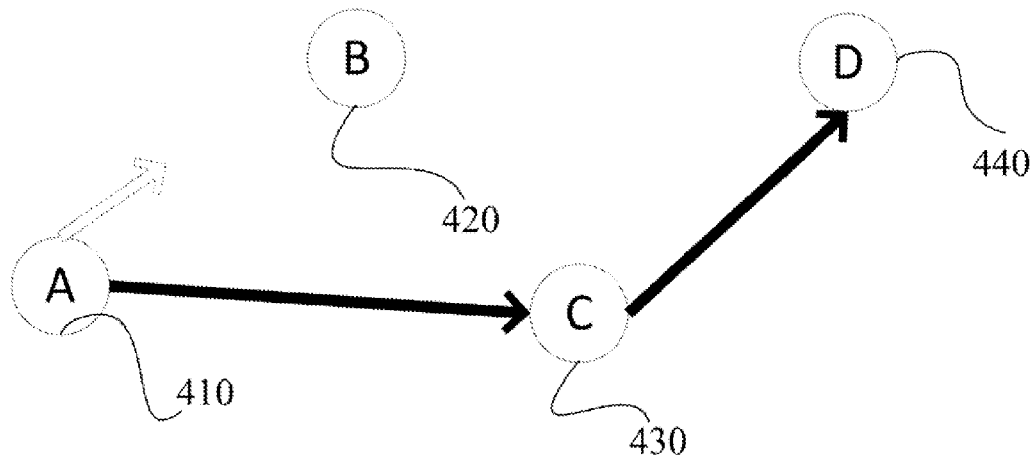
FIG. 4b shows an example visualization corresponding to a node structure and an un-intended transmission route according to an implementation of the disclosed subject matter.

The source A 410 may transmit a packet frame containing the relay schedule at 0 ms based on the time designated by the relay schedule. The 0 ms may be arbitrary such that it can correspond to any time that the source node A 410 initiates the transmission. The subsequent relays times for all the nodes may be based on the initial transmission. For example, after the initial transmission by source A 410, the subsequent transmission by node B 420 can be 5 ms after the initial transmission. As shown in FIG. 4a, the transmission may proceed as intended from source A 410 to relay node B 420 to relay node C 430 to and destination D 440 based on the scheduled times. As shown in FIG. 4b, the initial transmission from source A 410 may not be received by node B 420 as intended. Instead, the transmission from source A 410 may be received by node C 430. Node C may relay the transmission to destination D 440 10 ms after the initial transmission, in accordance with the relay schedule. Notably, node C 430 may relay the transmission to destination D 440 at the 10 ms mark regardless of whether it receives the transmission, as intended, from relay B 420 or from another source (e.g., source A 410).

Figure 4C:
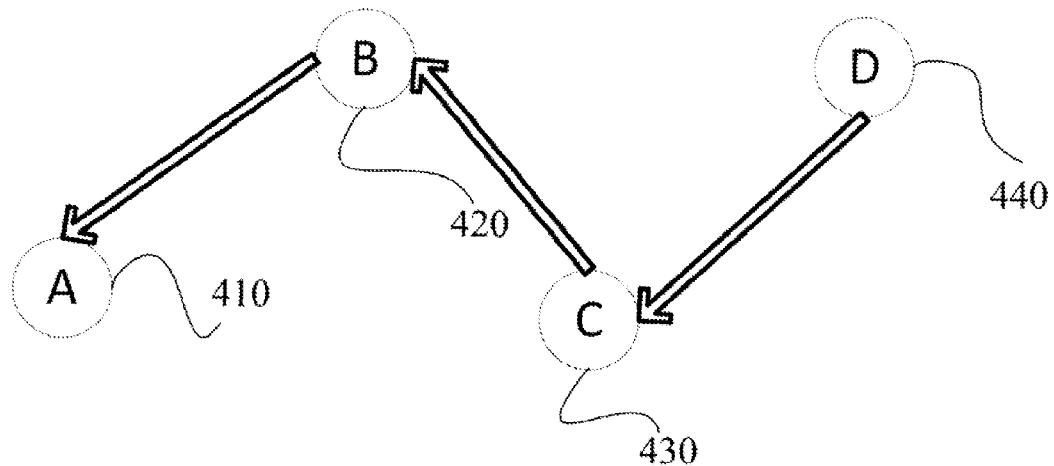
FIG. 4c shows an example visualization corresponding to a node structure and intended acknowledge route according to an implementation of the disclosed subject matter.
Figure 4D:
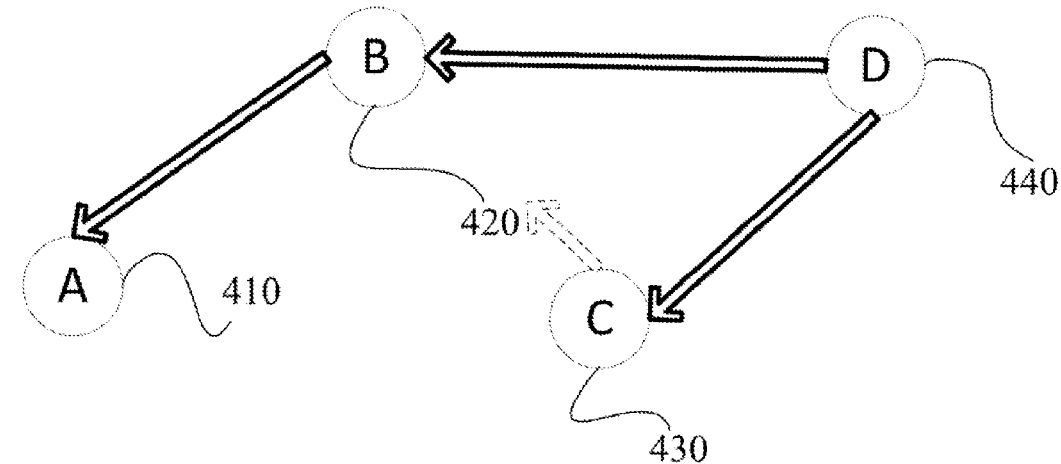
FIG. 4d shows an example visualization corresponding to a node structure and un-intended acknowledge route according to an implementation of the disclosed subject matter.

Continuing the example, the destination D 440 may transmit an acknowledge frame containing the relay schedule at 15 ms based on the time designated by the relay schedule. The subsequent relay nodes may also transmit the acknowledge frames based on the relay schedule. For example, after the acknowledge frame transmission by destination D 440, the subsequent acknowledge transmission by node C 430 can be 20 ms after the initial transmission. As shown in FIG. 4c, the acknowledge transmission may proceed as intended from destination D 440 to relay node C 430 to relay node B 420 and then source A 410 based on the scheduled times. As shown in FIG. 4b, the acknowledge transmission from destination D 440 may not be received by node C 430 as intended. Instead, the acknowledge transmission from destination D 440 may be received by node B 420. Node B may relay the transmission to source A 410 25 ms after the initial transmission, in accordance with the relay schedule. Notably, node B 420 relays the acknowledge transmission to source A 410 at the 25 ms mark regardless of whether it receives the transmission, as intended, from relay C 430 or from another source (e.g., destination D 440).

Figure 5:
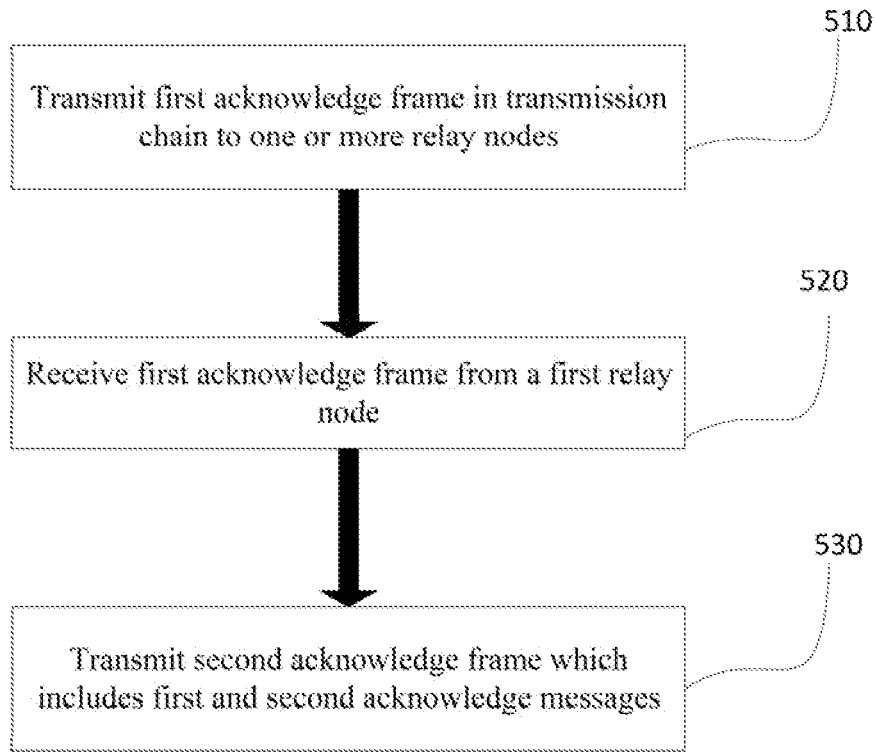
FIG. 5 shows an example process for stacking multiple acknowledge messages in an acknowledge frame according to an implementation of the disclosed subject matter.

According to implementations of the disclosed subject matter, as shown in FIG. 5 at 510, a first acknowledge frame containing a first acknowledge message may be transmitted from a node, such as a destination node. An acknowledge message may contain information corresponding to a type of delivery received by a node. The acknowledge message may contain any appropriate delivery-based information including, but not limited to, no delivery, frame received but rejected, frame received, frame received and accepted and working, frame received accepted and complete, or the like. At 520, a relay node may be configured to receive acknowledge frames from one or more nodes, including receiving the first acknowledge frame. At 530, the relay node may transmit a second acknowledge frame containing the first acknowledge message and a second acknowledge message. The second acknowledge message may correspond to an acknowledge message received via a different acknowledge frame than the first acknowledge frame received by the node. For example, a node A may receive a first acknowledge message from a destination node X. The node A may also receive an acknowledge message from a destination node Y. Accordingly, the node A may transmit an acknowledge frame containing stacked acknowledge messages from both destination node X and Y such that the acknowledge frame contains acknowledge messages from both destination node X and Y, as described herein.

According to an implementation of the disclosed subject matter, a first node may transmit an acknowledge frame based on one or more acknowledge frames containing acknowledge messages received from one or more relay nodes. The one or more relay nodes may be part of a transmission chain and may relay packet frames, acknowledge frames, or any applicable frame type. The first node may receive an acknowledge frame from a relay node as a result of the one or more relay nodes themselves generating an acknowledge message in response to a transmission and transmitting the respective acknowledge frame. Alternatively, the first node may receive an acknowledge frame from a relay node as a result of the relay node relaying an acknowledgement received from a destination node or another relay node. As an example, a relay node R may receive an acknowledge frame from a destination node D. The relay node R may transmit an acknowledge frame to a first node. The first node may also receive another acknowledgement frame from a different relay node L. The first node may "stack" the relay messages from relay nodes R and L and transmit a frame containing transmission messages from both of the relay nodes. Alternatively, a first node may transmit an acknowledge frame based on acknowledge messages received from one or more destination nodes. The first node may be a relay node or a destination node and may be part of a transmission chain. As an example, a destination node D1 may receive a packet frame and, based on receiving the packet frame, may send an acknowledge frame. A relay node R1 may receive the acknowledge frame from D1 along with another acknowledge frame from a second destination node D2. R1 may stack the acknowledge message from the acknowledge frame transmitted by D1 as well as the acknowledge message within the acknowledge frame transmitted by D2 and transmit an acknowledge frame based on the two messages. Alternatively, a first node may transmit an acknowledge frame based on an acknowledge message generated by the first node. The first node may be a relay node or a destination node and may generate the acknowledge message as a result of receiving a packet frame. As an example, a relay node R1 may receive a packet frame and may generate an acknowledge message based on the receiving the packet frame. The relay node R1 may also receive an acknowledge frame from a second relay node R2. R1 may stack the acknowledge message generated by R1 as well as the acknowledge message within the acknowledge frame transmitted by R2 and transmit an acknowledge frame based on the two messages. A second relay node or destination node that receives an acknowledge frame may hold and/or cancel transmission of the acknowledge frame if a first relay or destination node has already transmitted the acknowledgement and/or if a source node has received the acknowledgement. For example, a relay node R2 may receive an acknowledge frame but may cancel relaying the acknowledge message contained in the acknowledge frame based on a successful delivery of the acknowledge message made by a different relay node R1 to a source node S. It will be understood that any applicable combination of nodes including relay nodes, destination nodes, and the like may be used to implement the technique discussed herein.

Figure 7:
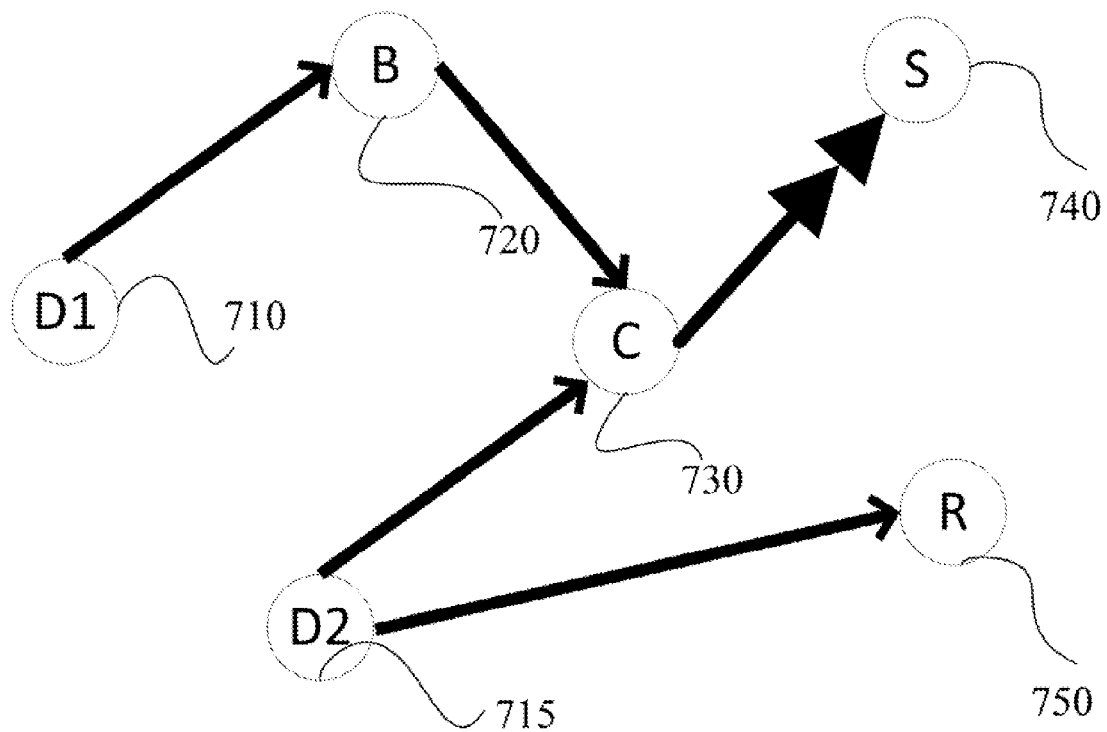
FIG. 7 shows an example visualization corresponding to stacking multiple acknowledge messages in an acknowledge frame according to an implementation of the disclosed subject matter.

FIG. 7 shows an illustrative example of stacking acknowledgement messages. As shown, a first destination node D1 710 may transmit an acknowledgement frame and a relay node B 720 may receive the transmission by D1 710. The transmission by D1 710 may contain an acknowledgement message stating that D1 710 received a respective transmission and is currently conducting work based on the transmission. The relay node B 720 may relay the acknowledgement message in an acknowledgement frame and a second relay node C 730 may receive the acknowledgment frame. Additionally, a second destination node D2 715 may transmit an acknowledgement frame which contains an acknowledgement message stating that D2 715 received the respective transmission and has completed the work based on the transmission. The transmission by D2 715 may be received by the second relay node C 730. The second relay node C 730 may generate a transmission message such that the acknowledge message from D1 and from D2 are stacked within its transmission message. More specifically, in this example the transmission message transmitted by C contains information indicating that D1 710 received the transmission and is currently conducting work based on the transmission, and also indicating that D2 715 received the transmission and has completed the work corresponding to the transmission. A third relay node R 750 may receive the acknowledge frame from D2 715 after relay node C 730 has transmitted the stacked acknowledge frame and the source S 740 has received the stacked acknowledge frame. The third relay node R 750 may refrain from sending an acknowledge frame based on the acknowledge message from D2 715, based on the successful transmission and receipt by source S 740 of the acknowledge frame transmitted by relay node C 730.

According to an implementation of the disclosed subject matter, acknowledge frames may be transmitted in a sequential manner. Sequentially organizing transmission of acknowledge frames may reduce frame collisions and improve the overall quality of transmissions. The sequence of frame transmissions may be based on a relay schedule as disclosed herein. For example, a relay schedule may be transmitted with all frame transmissions in the transmission chain. The relay schedule may include acknowledge frame transmission times such that each node in a transmission chain is assigned a time for transmitting the acknowledge frames. The nodes may transmit acknowledge frames based on their respective scheduled times and one or more other nodes may hold transmissions during that time. Alternatively, the sequence may be based on a staggered, serialized arrangement such that each node transmits an acknowledgement frame based on time relative to a common position, such as the time at which a destination node which receives a transmission generates and transmits an acknowledge message. According to an implementation, each outgoing packet frame may indicate when to transmit an acknowledgement frame relative to a common absolute position. The sequence may be based on a unique node value assigned to each relay node. For example, a destination node D1 may transmit an acknowledgement frame, and a first relay R1 with a unique node value X may receive the acknowledgement frame. The relay R1 may transmit an acknowledgement frame based on the acknowledgement message from D1 at a time X milliseconds after the transmission from D1. A second relay node R2 may have a different unique value Y, and may relay a transmission Y seconds after a destination node transmits a node. Alternatively, the sequence may be based on a time based on the node value, and more specifically based on a repeatable function using the node value. As an example, the time when a specific node N with a node value of X may transmit at any time corresponding to time X+*100||<900 such that the node N may transmit within a given second at X ms, (X+100) ms, (X+200) ms and so on until time X+900 ms. Specifically, if X equaled 15, then node N may transmit at 15, 115, 215, 315, 415, . . . , 915. According to this example, the transmission may utilize one hundred unique nodes.

A relay node receiving multiple acknowledge frames may store and/or transmit acknowledge frames based on the multiple acknowledge messages as disclosed herein. More specifically, the relay node may stack and transmit acknowledge messages related to the same transmission together, as previously described. In an illustrative example, the arrangement shown in FIG. 7 may be implemented in a sequential manner. A first destination node D1 710 may transmit an acknowledge frame containing an acknowledge message and the acknowledge message may be received by relay node C 730 via relay node B 720. A second destination node D2 715 may transmit an acknowledge frame based on the same transmission as the one received by D1 710 and the acknowledge frame may be received by relay node C 730. Relay node C 730 may have a node value of 45 and may transmit based on X+*100||<900, as disclosed herein. Accordingly, if relay node C 730 receives the acknowledgement frame from relay node B 720 at 209 ms after a common transmission time, and receives the acknowledgement frame from destination node D2 715 at 235 ms, then relay node C 730 may transmit a stacked acknowledge frame at 245 ms. If relay node C 730 receives the acknowledgement frame from relay node B 720 at 209 ms after a common transmission time, and receives the acknowledgement frame from destination node D2 715 at 312 ms, then relay node C 730 may transmit a packet frame corresponding to the transmission from relay node B 720 at 245 ms and a stacked acknowledge frame corresponding to the transmissions from nodes B 720 and D2 715 at 345 ms.

According to an implementation of the disclosed subject matter, in an arrangement without a predefined or dynamically determined schedule, a node may contend with one or more other nodes prior to transmitting a transmission or acknowledge frame to determine which node should transmit at a particular time. The contention may last for a contention period which may be predefined or may be dynamically determined by the transmitting node or a controller. The contention may include listening for transmissions by other nodes prior to transmitting a node and/or determining whether any node is scheduled to transmit at a given time. The contention may result in a transmission order such that one or more nodes gains access to the access medium and may further include denying one or more other nodes access to the access medium. The one or more other nodes which are denied access to the access medium at the first time may be granted access to the medium at a second time or, alternatively, may be denied the current request for access entirely. Access based on contention periods may be granted to one or more nodes based on any applicable factor such as, but not limited to, designation of a higher priority node, higher priority transmission, transmission strength, signal strength, or the like. Namely, the contention may result in fewer transmissions at the same time and, thus, may result in fewer collisions.

According to an implementation of the disclosed subject matter, a source node may retransmit a packet frame based whether or not it receives one or more acknowledge frames. For example, a source node may transmit a packet frame intended for three destination nodes. The packet frame may be relayed through one or more relay nodes and two of the three destination nodes may receive the packet frame as intended and, accordingly, transmit respective acknowledge frames. The third destination node may not receive the transmission and, accordingly, may not transmit an acknowledge frame. The source node may receive acknowledge messages from the first and second destination nodes and, based on the lack of acknowledge message from the third destination node, may retransmit the packet frame intended just for the third destination node.

According to an implementation of the disclosed subject matter, the wireless transmission may be autonomous such that relay nodes may be added to or omitted from the transmission chain based on an efficiency preference. The efficiency preference may be associated with the transmission and may be used to balance the speed of a transmission versus the reliability of the transmission. The speed of a transmission may increase with a lower number of nodes as more frequent and less cumbersome transmissions may be executed with a lower number of nodes. For example, a transmission chain containing 10 relay nodes may assign 10 unique values to each relay node, requiring each node to wait at least 10 ms prior to transmitting a frame. Additionally, if each node is required to acknowledge receipt of receiving a packet frame, there may be acknowledge frames transmitted by the 10 relay nodes in addition to any destination nodes, resulting in a higher probability for collisions. In comparison, a transmission chain containing 3 nodes may only assign 3 unique values to each node, requiring each node to wait only 3 ms prior to transmitting a frame and resulting in a significantly lower number of acknowledge frames. In contrast, the reliability of a transmission may increase with an increased amount of relay nodes. For example, a transmission chain containing 10 relay nodes will generally have a higher probability of ensuring delivery to a destination node when compared to a transmission chain containing 3 relay nodes in the same or similar environment. Accordingly, the number of nodes in a transmission chain can correspond to a respective transmission speed and reliability. The nodes in a transmission chain may be adjusted based on an efficiency preference such that a higher transmission speed preference may result in a lower number of nodes and a higher reliability preference may result in a higher number of nodes.

As an example, an efficiency score ranging between 0 and 9 may correspond to a transmission such that an efficiency score of 0 indicates a preference to use a higher speed and lower reliability arrangement, and an efficiency score of 9 indicates a preference for a slower speed and higher reliability. As a specific example, a video game setup may be configured such that two different types of transmissions are made by an originating node, an opponent location and a percentage complete statistic. The opponent location may be the location within a video game map of one or more opponents who are competing against a user playing the video game. The percentage complete may be the percentage of the video game map explored by the user. The opponent location may frequently change within the video game, whereas the percentage complete may be a critical statistic in the video game and may change infrequently. Based on the respective attributes for the two types of transmissions, the efficiency score for an opponent location transmission may be 1, and the efficiency score for a percentage complete statistic transmission may be 7. Accordingly, the number of relay nodes participating in the transmission chain may be lower for an opponent location transmission in comparison to a percentage complete transmission. The number of relay nodes participating in a transmission may be adjusted by any applicable technique including, but not limited to, a relay schedule, a network topography controller, a source node designation, a unique node value designator, or the like.

Figure 6:
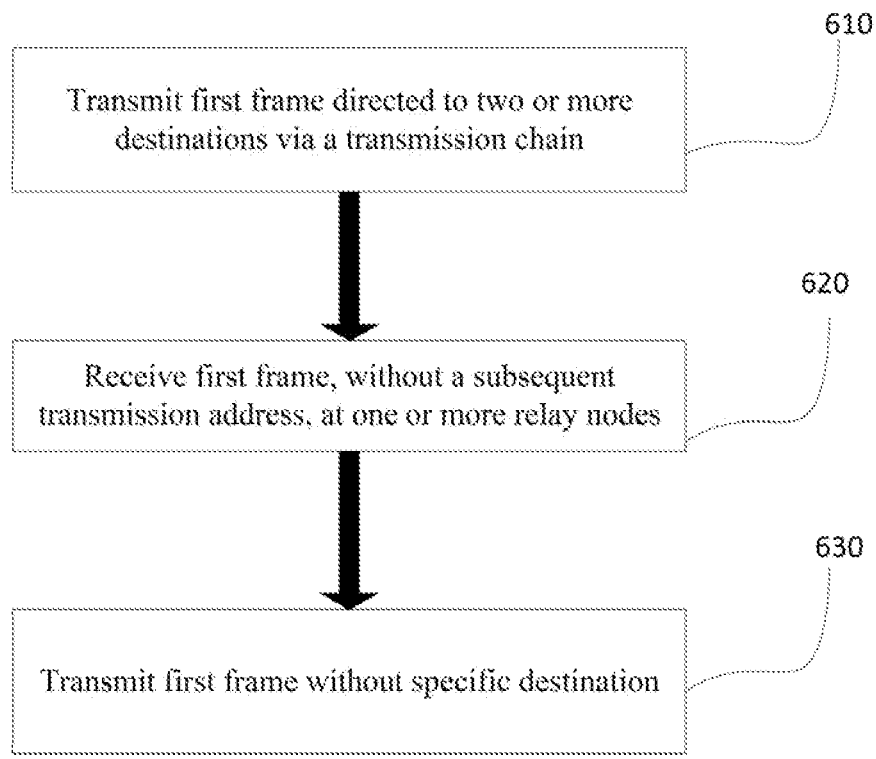
FIG. 6 shows an example process for blind transmission of frames according to an implementation of the disclosed subject matter.

According to an implementation of the disclosed subject matter, as shown in FIG. 6 at step 610, a first frame directed at two or more destination nodes may be transmitted via a transmission chain as disclosed herein. The transmission chain may include one or more relay nodes and, at step 620, the one or more relay nodes may receive the first fame. The first frame may not include a transmission address such that the relay node may not have a specific address to which the received frame should be relayed. At step 630, the one or more relay nodes may transmit the first frame such that it is not directed towards a specific node. Notably, a relay node that is part of the transmission chain may receive and relay a frame "blind," such that no specific destination address information is used for the relay. Based on an implementation, a non-neighboring relay node may be a node that is not a subsequent node in a transmission chain based on any applicable sequence scheme such as, but not limited to, network topology, physical topology, a relay schedule, or the like. Accordingly, if a non-neighboring relay node receives a packet frame, it may relay the packet frame even if it does not receive the transmission directly from a neighboring frame. It will be understood that any applicable type of frame including packet frames, acknowledge frames, pings, or the like may be used to implement the technique discussed herein.

Figure 8:
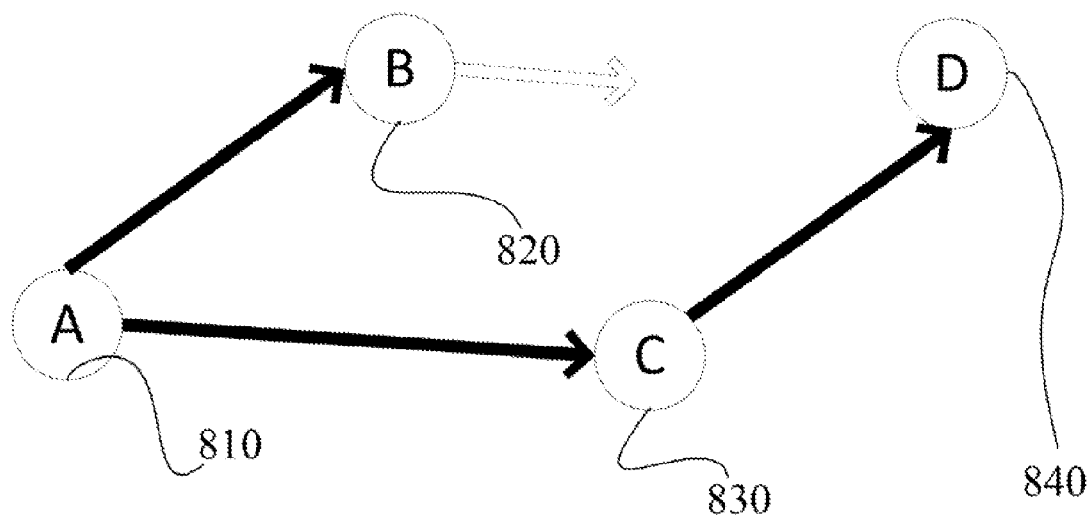
FIG. 8 shows an example visualization corresponding to blind transmission of frames according to an implementation of the disclosed subject matter.

FIG. 8 shows an illustrative example of a non-neighboring frame relaying a packet frame. According to this example, the network topology is such that nodes A 810, B 820, C 830, and D 840 are arranged in order. Source node A 810 may transmit a packet frame. Both B 820, the neighboring node and C 830, the non-neighboring node, may receive the transmission and relay the packet frame blind. A transmission from B 820 may fail to reach either C 830 or D 840. However, the transmission from C 830 can reach D 840, rendering the transmission successful. A source or relay node may contend with any other node prior to transmitting or relaying a frame without a specific destination address according to the techniques disclosed herein.

The blind relay of frames may be conducted in a sequential manner, according to the techniques disclosed herein. For example, in FIG. 8, node B 820 may have a node value of 1 and node C 830 may have a node value of 2 such that node B 820 transmits at odd millisecond marks and node C 830 transmits at even millisecond marks. The millisecond marks may be based on an original transmission by node A 810. Further, a packet frame may be retransmitted by a source node based on one or more acknowledge messages according to the techniques disclosed herein. For example, in FIG. 8, the destination node D 840 may be configured to generate an acknowledge message and transmit an acknowledge frame intended for the source node A 810. Source node A 810 may retransmit a packet frame for which a respective acknowledge message from destination D 840 has not been received. Additionally, the blind wireless transmission may be autonomous such that relay nodes may be added or omitted form the transmission chain based on an efficiency preference, according to techniques disclosed herein. For example, a fast transmission efficiency preference for a specific packet frame may result in fewer nodes being part of the transmission chain whereas a high reliability efficiency preference for a specific transmission may result in an increased number of nodes being part of the transmission chain.

Figure 1:
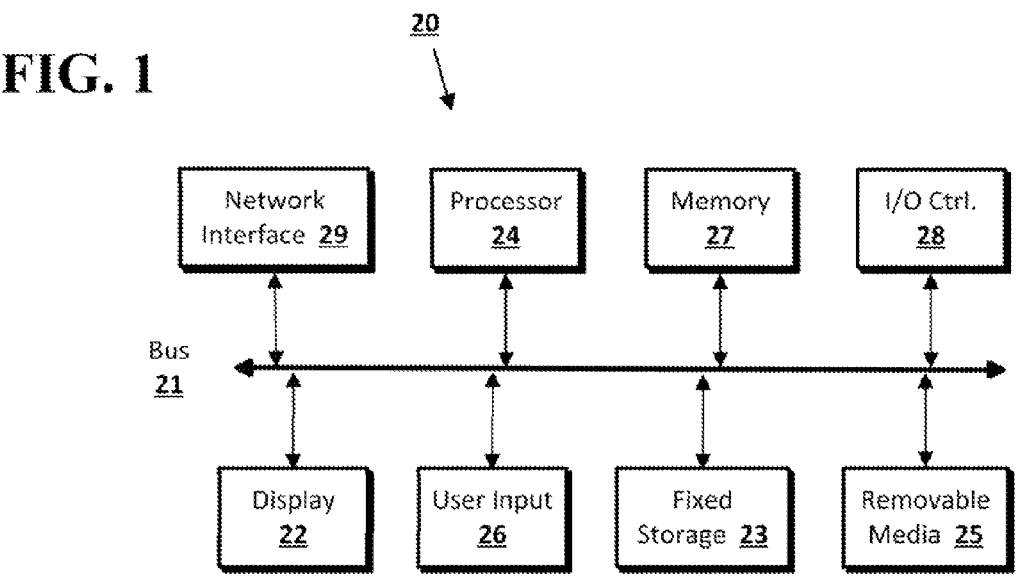
FIG. 1 shows a computer according to an implementation of the disclosed subject matter.

Implementations of the presently disclosed subject matter may be implemented in and used with a variety of component and network architectures. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
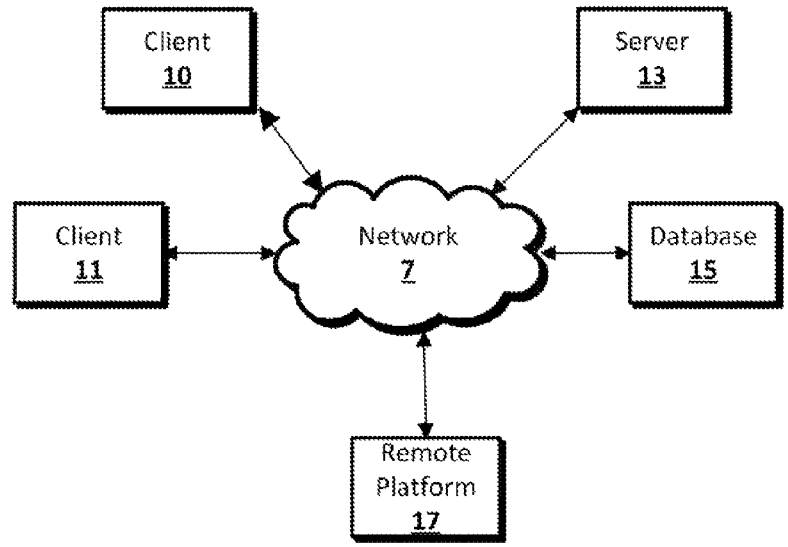
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
    receiving, at a first relay node, a first acknowledge frame comprising a first acknowledge message in a transmission chain, the transmission chain comprising one or more relay nodes;
    determining a sequence based on a node value assigned to the first relay node; and
    transmitting, according to the sequence, a second acknowledge frame from the first relay node, the second acknowledge frame comprising the first acknowledge message and a second acknowledge message.

2. The method of claim 1, wherein determining the sequence is further based on a repeatable function that uses the node value.

3. The method of claim 1, wherein determining the sequence is further based on a total number of nodes in the transmission chain.

4. The method of claim 1, wherein the sequence comprises staggered transmission times for two or more nodes in the transmission chain.

5. The method of claim 1, further comprising:
    determining that an acknowledge frame comprising an acknowledge message has been successfully transmitted from the first relay node; and
    in response to the determination, refraining from transmitting an acknowledge frame comprising the acknowledge message.

6. The method of claim 1, further comprising:
    determining that an acknowledge message has not been successfully received at a source node from a destination node; and
    in response to the determination, retransmitting a packet frame from the source node to the destination node.

7. The method of claim 1, wherein the second acknowledge message is generated by the first relay node.

8. The method of claim 1, wherein the first acknowledge message is generated by a destination node.

9. The method of claim 1, wherein the first acknowledge message is generated by a first destination node, and the second acknowledge message is generated by a second destination node.

10. The method of claim 1, further comprising, prior to determining the sequence, adding a relay node to the transmission chain based on an efficiency preference.

11. A system comprising:
    a plurality of nodes; and
    a processor that is in communication with a node of the plurality of nodes and that is configured to execute instructions comprising:
        receiving, at a first relay node of the plurality of nodes, a first acknowledge frame comprising a first acknowledge message in a transmission chain, the transmission chain comprising one or more relay nodes of the plurality of nodes;
        determining a sequence based on a node value assigned to the first relay node; and
        transmitting, according to the sequence, a second acknowledge frame from the first relay node, the second acknowledge frame comprising the first acknowledge message and a second acknowledge message.

12. The system of claim 11, wherein determining the sequence is further based on a repeatable function that uses the node value.

13. The system of claim 11, wherein determining the sequence is further based on a total number of nodes in the transmission chain.

14. The system of claim 11, wherein the sequence comprises staggered transmission times for two or more nodes of the plurality of nodes in the transmission chain.

15. The system of claim 11, wherein the processor is further configured to execute instructions comprising:
    determining that an acknowledge frame comprising an acknowledge message has been successfully transmitted from the first relay node; and
    in response to the determination, refraining from transmitting an acknowledge frame comprising the acknowledge message.

16. A non-transitory computer readable medium storing instructions comprising:
- receiving, at a first relay node, a first acknowledge frame comprising a first acknowledge message in a transmission chain, the transmission chain comprising one or more relay nodes;
- determining a sequence based on a node value assigned to the first relay node; and
- transmitting, according to the sequence, a second acknowledge frame from the first relay node, the second acknowledge frame comprising the first acknowledge message and a second acknowledge message.

17. The non-transitory computer readable medium of claim 16, wherein the second acknowledge message is generated by the first relay node.

18. The non-transitory computer readable medium of claim 16, wherein the first acknowledge message is generated by a destination node.

19. The non-transitory computer readable medium of claim 16, wherein the first acknowledge message is generated by a first destination node, and the second acknowledge message is generated by a second destination node.

20. The non-transitory computer readable medium of claim 16, storing instructions further comprising:
- prior to determining the sequence, adding a relay node to the transmission chain based on an efficiency preference.

* * * * *